(12) United States Patent
Zaremba et al.

(10) Patent No.: US 7,313,470 B2
(45) Date of Patent: Dec. 25, 2007

(54) VEHICLE TORQUE MONITORING SYSTEM

(75) Inventors: Alexander Zaremba, Dearborn Heights, MI (US); Miroslava Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 701 days.

(21) Appl. No.: 10/711,041

(22) Filed: Aug. 19, 2004

(65) Prior Publication Data

US 2006/0041343 A1    Feb. 23, 2006

(51) Int. Cl.
   *B60L 9/00*    (2006.01)
(52) U.S. Cl. .................. 701/22; 701/52; 701/53; 477/3; 477/15; 180/65.3
(58) Field of Classification Search .............. 701/22, 701/52, 53, 54; 477/3, 6, 15; 180/65.3
See application file for complete search history.

(56) References Cited

U.S. PATENT DOCUMENTS

| | | | |
|---|---|---|---|
| 5,864,771 A | 1/1999 | Yokoyama et al. | |
| 6,018,694 A | 1/2000 | Egami et al. | |
| 6,336,889 B1 | 1/2002 | Oba et al. | |
| 6,453,222 B1 | 9/2002 | Lasson et al. | |
| 6,465,977 B1 | 10/2002 | Farkas et al. | |
| 6,510,370 B1 | 1/2003 | Suzuki et al. | |
| 6,595,895 B2 * | 7/2003 | Suzuki et al. | ............... 477/3 |
| 7,223,203 B2 * | 5/2007 | Yamazaki et al. | ............ 477/15 |
| 2002/0052677 A1 | 5/2002 | Lasson et al. | |
| 2002/0107617 A1 | 8/2002 | Tomikawa | |

* cited by examiner

*Primary Examiner*—Gertrude A. Jeanglaude
(74) *Attorney, Agent, or Firm*—David B. Kelley; Brooks Kushman P.C.

(57) ABSTRACT

A distributed torque monitoring and control system for a hybrid vehicle. The hybrid vehicle has a power transfer unit adapted to drive a vehicle wheel and a power source adapted to drive the power transfer unit. The system includes a local torque monitor and a vehicle level torque monitor. The local torque monitor is associated with the power source and is adapted to implement a local mitigation strategy to inhibit undesired torque. The vehicle level torque monitor is adapted to implement a vehicle level mitigation strategy to inhibit acceleration of the hybrid vehicle if the local mitigation strategy is unsuccessful.

20 Claims, 4 Drawing Sheets

VEHICLE TORQUE MONITORING SYSTEM

BACKGROUND OF INVENTION

1. Field of the Invention

The present invention relates generally to the operation of hybrid vehicles, and more particularly to a distributed system and method for monitoring and controlling torque in a hybrid electric vehicle.

2. Background Art

Previously, hybrid vehicles included a control unit for controlling a level of torque provided by a motor-generator. An example of such a system is described in U.S. Pat. No. 6,510,370. Such control systems focused on making the motion of a hybrid vehicle propelled by the motor-generator as similar as possible to the motion of the hybrid vehicle when propelled by an engine. Moreover, such control systems did not employ a distributed torque monitoring architecture or mitigation strategies to inhibit undesired torque or inhibit vehicle acceleration not requested by the driver.

SUMMARY OF INVENTION

According to one aspect of the present invention, a control system for a hybrid vehicle is provided. The hybrid vehicle has a power transfer unit adapted to drive a vehicle wheel and a power source adapted to drive the power transfer unit. The system includes a local torque monitor and a vehicle level torque monitor. The local torque monitor is associated with the power source and is adapted to implement a local torque mitigation strategy to inhibit undesired torque. The vehicle level torque monitor is adapted to implement a vehicle level torque mitigation strategy to inhibit unintended acceleration of the hybrid vehicle if the local torque mitigation strategy is unsuccessful.

The power source may be an internal combustion engine or a motor-generator.

The system may include first and second power sources and first and second local torque monitors adapted to monitor and control the first and second power sources, respectively. The system may include a vehicle system control unit adapted to control the first and second power sources and receive commands from the vehicle level torque monitor when the vehicle level torque mitigation strategy is implemented.

According to another aspect of the present invention, a method for monitoring and controlling torque in a hybrid vehicle is provided. The hybrid vehicle includes a power transfer unit, a power source, a local torque monitor, a vehicle level torque monitor, and a vehicle system control unit. The power transfer unit is adapted to drive a vehicle wheel. The power source is adapted to provide a driving torque to the power transfer unit. The local torque monitor is associated with the power source. The vehicle level torque monitor is associated with the local torque monitor. The vehicle system control unit is adapted to receive commands from the vehicle level torque monitor and control the power source.

The method includes the steps of calculating first and second torque values, determining whether the first and second torque values are within a limit range, implementing a local torque mitigation strategy with the local torque monitor to inhibit undesired torque if the first and second estimated torque values are not within the limit range, and implementing a vehicle level torque mitigation strategy with the vehicle level torque monitor if the local torque mitigation strategy does not cause the first and second torque values to fall within the limit range in a set period of time.

The step of determining whether the first and second torque values are within the limit range may include sending a pass signal from the local torque monitor to the vehicle level torque monitor if the estimated values are within the limit range.

The step of implementing the vehicle level torque mitigation strategy may include sending a failure signal from the local torque monitor to the vehicle level torque monitor.

The step of implementing the vehicle level torque mitigation strategy may include calculating a first torque demand value indicative of acceleration demanded by a vehicle operator, an estimated wheel torque value indicative of the torque provided to the vehicle wheel, and an upper limit value indicative of a maximum acceptable torque at the vehicle wheel.

The step of implementing the vehicle level torque mitigation strategy may include determining whether the first torque demand value is less than a second torque demand value provided by the vehicle system control unit to determine if the vehicle system control unit has properly interpreted the acceleration demanded and comparing the estimated wheel torque value to the upper limit value to determine whether the vehicle is accelerating more than desired by the vehicle operator.

According to another aspect of the present invention, a method for monitoring and controlling torque in a hybrid vehicle is provided. The hybrid vehicle includes a power transfer unit, a power source, a local torque monitor, a vehicle level torque monitor, and a vehicle system control unit. The power transfer unit is adapted to drive a vehicle wheel. The power source is adapted to provide torque to the power transfer unit. The local torque monitor is associated with the power source. The vehicle level torque monitor is associated with the local torque monitor. The vehicle system control unit is adapted to receive commands from the vehicle level torque monitor and control the power source.

The method includes the steps of determining first and second estimated torque values, implementing a local torque mitigation strategy with the local torque monitor to inhibit undesired torque if the first and second estimated torque values are not within a limit range, and implementing a vehicle level torque mitigation strategy if the local torque mitigation strategy does not cause the first and second estimated torque values to fall within the limit range in a set period of time. The vehicle level torque mitigation strategy includes calculating an estimated wheel torque value and an upper limit value and implementing a torque control strategy if the estimated wheel torque value is greater than the upper limit value.

The vehicle level torque mitigation strategy may repeat the calculating and implementing steps if the estimated wheel torque value is less than the upper limit value.

The step of calculating the estimated wheel torque value may be based on a first signal indicative of a power transfer unit torque ratio and either the first or second estimated torque values.

The step of calculating the estimated wheel torque value further comprises calculating a first torque demand value indicative of a torque demanded by a vehicle operator, obtaining a second torque demand value from the vehicle system control unit, and comparing the first and second torque demand values to determine whether the vehicle system control unit has properly interpreted the torque demanded by the vehicle operator. The step of calculating the first torque demand value may be based on a second signal indicative of an accelerator pedal position and a third signal indicative of a vehicle speed.

The step of implementing the local torque mitigation strategy may include reducing the torque provided by the power source to the power transfer unit or providing a fault mode signal to the vehicle level torque monitor. The step of implementing the torque control strategy may include commanding the vehicle system control unit to reduce the torque provided by the power source.

DETAILED DESCRIPTION OF THE PREFERRED EMBODIMENT (S)

Figure 1:
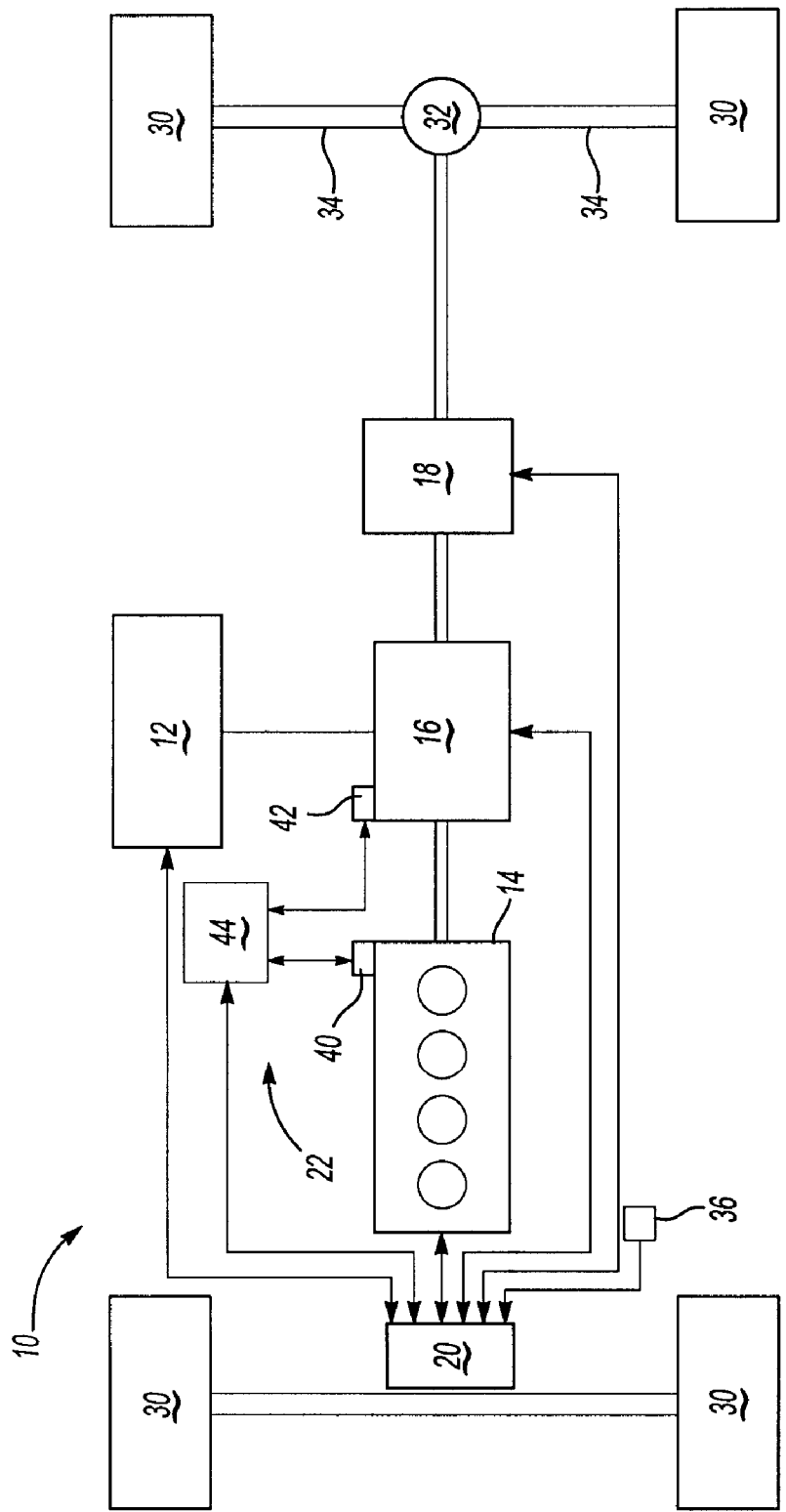
FIG. 1 is a schematic of a hybrid electric vehicle.

Referring to FIG. 1, a schematic of a hybrid electric vehicle 10 is shown. The hybrid electric vehicle 10 may have any suitable drive train configuration, such as a series hybrid drive, parallel hybrid drive, or split hybrid drive as is known by those skilled in the art. In addition, the hybrid electric vehicle 10 may have one or more sources of power or torque.

In the embodiment shown in FIG. 1, the hybrid electric vehicle 10 includes a voltage source 12, a first power source 14, a second power source 16, a power transfer unit 18, a vehicle system control unit 20, and a distributed torque monitoring system 22.

The voltage source 12 may be of any suitable type, such as a battery, a battery pack having a plurality of electrically interconnected cells, or a capacitor.

The first and second power sources 14,16 may be adapted to drive or provide torque to the power transfer unit 18. The first and second power sources 14,16 may be of any suitable type, such as an engine, fuel cell, or motor-generator. In the embodiment shown in FIG. 1, the first power source 14 is configured as an internal combustion engine and the second power source 16 is configured as a motor-generator adapted to be driven by the voltage source 12 or the first power source 14.

The power transfer unit 18 may be adapted to drive one or more vehicle traction wheels 30. More specifically, the power transfer unit 18 may be adapted to use gearing and/or torque conversion to change the ratio between the rotational speed of a power source 14,16 and the rotational speed of a vehicle traction wheel 30. In one embodiment, the power transfer unit 18 is connected to a differential 32 that is connected to a pair of axles 34 that are each connected to a vehicle traction wheel 30. Alternatively, the power transfer unit 18 may be disposed between the first power source 14 and the second power source 16 such that the second power source 16 is connected to the differential 32.

The vehicle system control unit 20 monitors and controls various aspects of the hybrid electric vehicle 10. For example, the vehicle system control unit 20 may be connected to the voltage source 12, first power source 14, second power source 16, and/or power transfer unit 18 to monitor and control their operation and performance. Moreover, the vehicle system control unit 20 may communicate with various electronic control units that control various subsystems to coordinate their operation to achieve desired vehicle performance. The vehicle system control unit 20 may receive input signals from various sensors that detect environmental conditions, vehicle performance attributes, and/or driver inputs. For example, the vehicle system control unit 20 may receive a signal from an accelerator pedal position sensor 36 indicative of the vehicle acceleration demanded by the driver.

The distributed torque monitoring system 22 includes local and vehicle level torque monitors. More specifically, each power source has a local torque monitor that communicates with the vehicle level torque monitor. In the embodiment shown in FIG. 1, the distributed torque monitoring system 22 includes a first local torque monitor 40 associated with the first power source 14, a second local torque monitor 42 associated with the second power source 16, and a vehicle level torque monitor 44.

The local torque monitors 40,42 monitor the sensors and actuators associated with their respective power sources 14,16 and implement a local mitigation strategy in the event that an undesired level of torque is detected.

The vehicle level torque monitor 44 ensures that the power sources 14,16 provide the level of torque demanded by the vehicle driver. In addition, the vehicle level torque monitor 44 may confirm that the vehicle system control unit 20 is operating properly and implement a vehicle level torque mitigation strategy in the event that the local mitigation strategy is unsuccessful.

Figure 2:
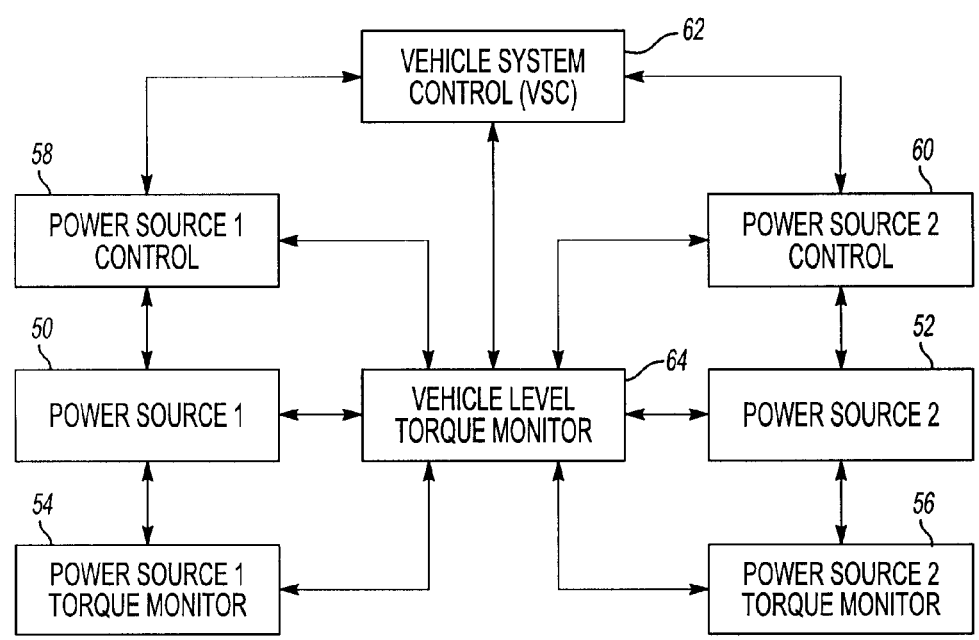
FIG. 2 is a schematic of a monitoring and control system for the hybrid electric vehicle.

Referring to FIG. 2, a schematic of the distributed torque monitoring and control system architecture is shown. In this schematic, the arrows represent communication and/or control paths between vehicle subsystems or components. For simplicity, this schematic includes two power sources 50,52. However, the system architecture is scalable to accommodate one or more power sources.

A local torque monitor 54,56 and a local control unit 58,60 may be associated with each respective power source 50,52. The local control units 58,60 communicate with and are controlled by a vehicle system control unit 62.

The vehicle level torque monitor 64 communicates and/or commands the vehicle system control unit 62 and each power source 50,52, local torque monitor, 54,56, and local control unit 58,60. Moreover, the vehicle level torque monitor 64 may be adapted to assess whether these components are functioning properly.

This hierarchical distributed control architecture with multiple monitoring and control points helps avoid unintended vehicle acceleration after having a single point of failure. For instance, if a system or subsystem is not functioning properly, the vehicle level torque monitor 64 may send instructions to another subsystem or component to compensate.

Figure 3:
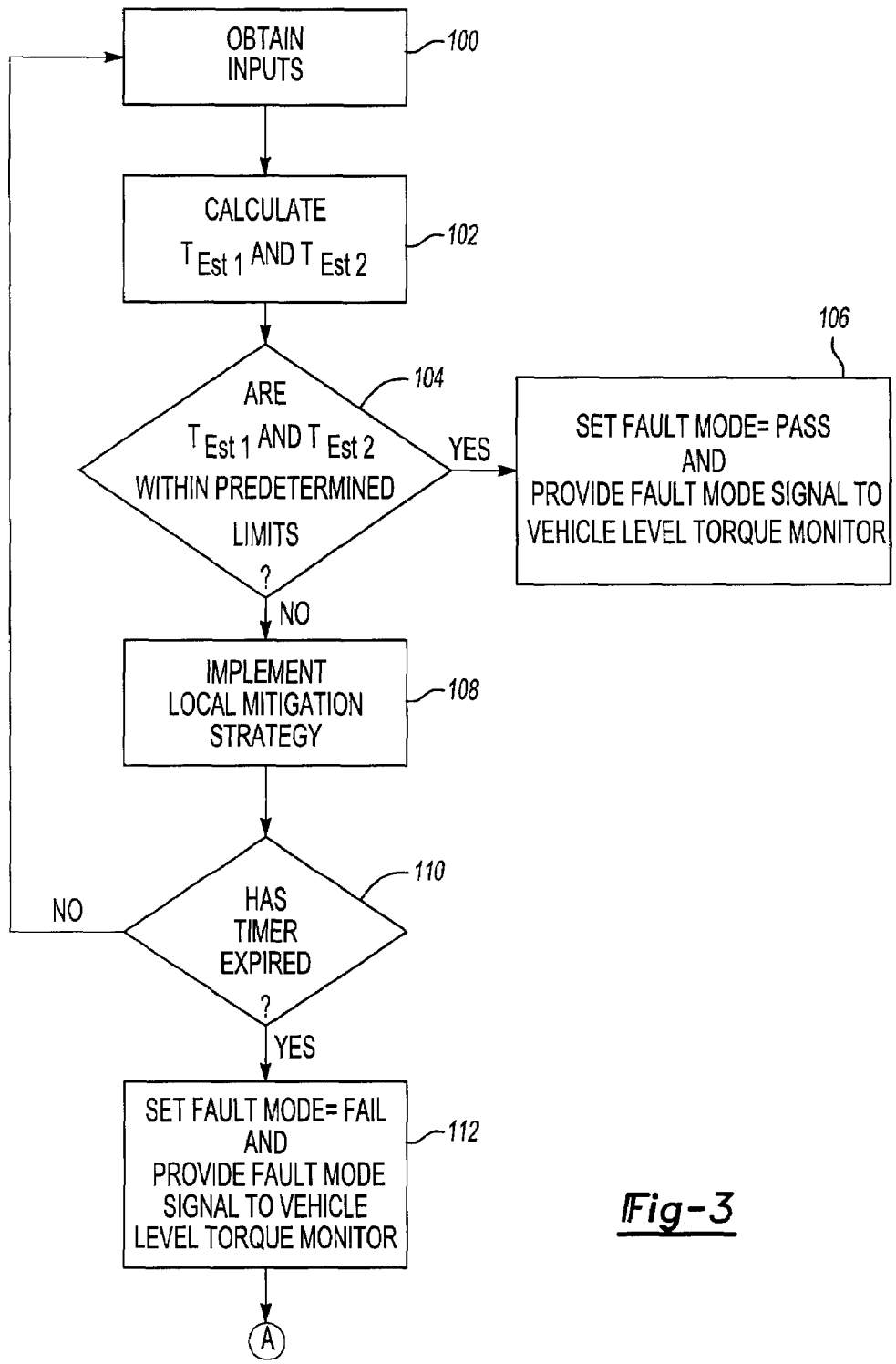
FIGS. 3 and 4 are flowcharts of a method for monitoring and controlling torque in the hybrid electric vehicle.
Figure 4:
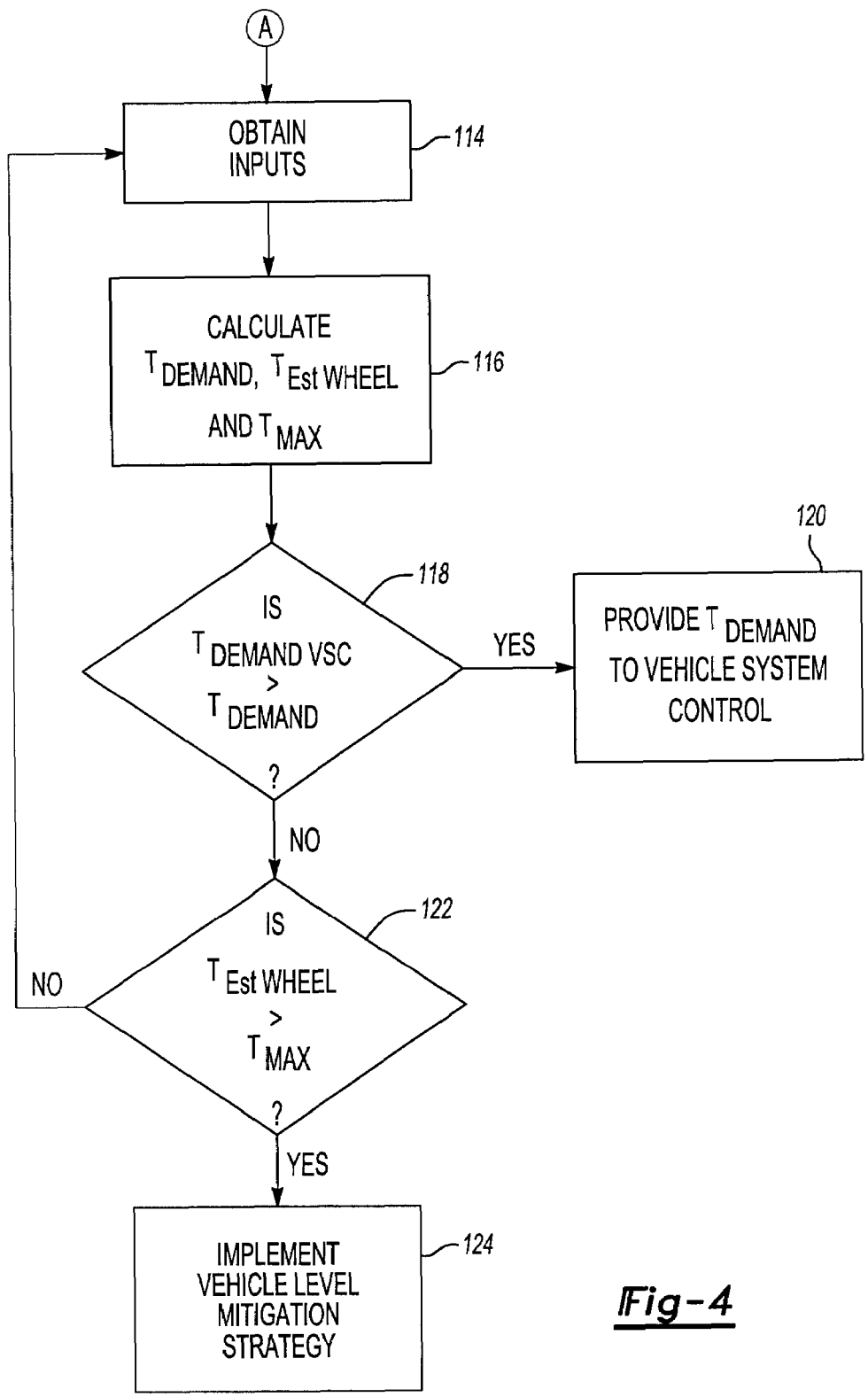

Referring to FIGS. 3 and 4, a method for monitoring and controlling torque in the hybrid electric vehicle 10 is shown. More specifically, FIG. 3 depicts a flowchart of a local torque monitoring and control strategy and FIG. 4 depicts a flowchart of a vehicle level torque monitoring and control strategy.

As will be appreciated by one of ordinary skill in the art, the flowcharts represent control logic which may be implemented using hardware, software, or combination of hardware and software. For example, the various functions may be performed using a programmed microprocessor.

The control logic may be implemented using any of a number of known programming or processing techniques or strategies and is not limited to the order or sequence illustrated. For instance, interrupt or event-driven processing is typically employed in real-time control applications, such as control of a power source or vehicle sub-system, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

The following discussion of FIGS. 3 and 4 is made in view of the hybrid vehicle configuration shown in FIG. 1 having two power sources. However, the method may be configured for any suitable number of power sources and/or power transfer units.

At 100 in FIG. 3, the local torque monitor receives various input signals indicative of the current operating state of its associated local power source.

At 102, the local torque monitor estimates the level of torque provided by the local power source. More specifically, the local torque monitor obtains or calculates one or more values indicative of an estimated level of torque using the input values. In one embodiment, a first estimated torque value ($T_{EST1}$) and a second estimated torque value ($T_{EST2}$) are provided or calculated using different input signals to facilitate independent torque estimates.

At 104, the first and second estimated torque values ($T_{EST1}$, $T_{EST2}$) are compared to limit range values. If the first and second estimated torque values are within the limit range, the level of torque is acceptable and the process continues at block 106. If the first and second estimated torque values are not within the limit range, the level of torque is not acceptable and process continues at block 108.

At 106, a fault mode signal (Fault Mode=Pass) indicative of an acceptable level of torque is provided to the vehicle level torque monitor. In addition, $T_{EST1}$ and $T_{EST2}$ may also be provided to the vehicle level torque monitor to support other monitoring and control functions.

At 108, a local torque mitigation strategy is implemented. The local torque mitigation strategy attempts to verify that the input signals are accurate, detect a power source failure, reconfigure the power source to bring the power source torque within the limit range, and/or shut down the power source to enhance safety. For example, the local torque mitigation strategy may use a different sensor if a sensor failure is detected or diagnosed, disable a sensor and adjust the torque estimate calculations accordingly, or limit operation of the power source to inhibit undesired torque which may also inhibit unintended vehicle acceleration. Optionally, the fault mode signal may be updated and provided to the vehicle level torque monitor to indicate that local mitigation efforts are in progress (Fault Mode=Caution).

At 110, the process determines whether a timer has expired. If a predetermined period of time has not lapsed, the process returns to block 100 to determine whether the local torque mitigation strategy has been successful. If the predetermined period of time has lapsed, then the local torque mitigation strategy has been unsuccessful and the process continues at block 112.

At 112, the fault mode signal is updated to indicate the failure of the local mitigation strategy (Fault Mode=Fail). The fault mode signal is then provided to the vehicle level torque monitor so that additional torque mitigation strategies may be considered.

At 114, the vehicle torque monitor obtains various input signals, such as estimated torque values from each of the power sources (designated as first and second estimated power torque values $T_{EST1}$, $T_{EST2}$), vehicle speed, accelerator pedal position, and the power transfer unit gear or torque ratio.

At 116, the vehicle level torque monitor calculates three additional values: $T_{DEMAND}$, $T_{EST\ WHEEL}$, and $T_{MAX}$. $T_{DEMAND}$ is indicative of the torque or vehicle acceleration demanded by the driver and may be based on a signal from the accelerator pedal position sensor and the vehicle speed. $T_{EST\ WHEEL}$ is the estimated torque provided to the vehicle traction wheels and may be based on the power transfer unit torque ratio and $T_{EST1}$ or $T_{EST2}$. $T_{MAX}$ is the maximum or upper limit value for the estimated wheel torque and may be based on vehicle performance characteristics, such as the operating limits of the power sources and/or power transfer unit as determined by vehicle testing.

At 118, the vehicle level torque monitor determines whether the vehicle system control unit has properly interpreted the driver's commands regarding the amount of acceleration or torque desired. More specifically, $T_{DEMAND}$ is compared to the torque demanded as interpreted by the vehicle system control unit ($T_{DEMAND\ VSC}$). If $T_{DEMAND}$ is less than $T_{DEMAND\ VSC}$, then the driver's commands have been misinterpreted and the process continues at block 120. If $T_{DEMAND}$ is greater than $T_{DEMAND\ VSC}$, then the vehicle system control unit has properly interpreted the driver's commands (i.e., the level of torque that the vehicle system control unit is requesting is not excessive) and the process continues at block 122.

At 120, $T_{DEMAND}$ may be provided to the vehicle system control unit to refresh the value of $T_{DEMAND\ VSC}$ since $T_{DEMAND}$ more accurately represents the driver's commands or for use in other calculations.

At 122, the vehicle level torque monitor determines whether the vehicle has responded by providing the torque requested by the driver. More specifically, $T_{EST\ WHEEL}$ is compared to $T_{MAX}$. If $T_{EST\ WHEEL}$ is less than or equal to $T_{MAX}$, then the vehicle torque is within acceptable limits and the process returns to block 114. If $T_{EST\ WHEEL}$ is greater than $T_{MAX}$, then the vehicle torque is outside of acceptable limits, which is indicative of unintended vehicle acceleration.

At 124, a vehicle level torque control strategy is implemented to end the unintended vehicle acceleration. This control strategy may include sending commands to one or more power sources and/or control units to reduce torque output, disabling a power source, sending an alert signal to the driver, or reducing the functionality of the vehicle, such as disabling the cruise control. Consequently, operation of the torque monitoring system is generally transparent to the driver until a vehicle level torque mitigation strategy is implemented.

The distributed torque monitoring system and method of the present invention preserves safe vehicle operation after a single point of failure since the torque monitors (and their inputs) have a high level of independence from the control units. As a result, unintended acceleration may be mitigated and vehicle safety is improved. Moreover, the present invention simplifies system design, streamlines control logic, and is easier to implement as compared to a single complex torque monitoring system.

While the best mode for carrying out the invention has been described in detail, those familiar with the art to which this invention relates will recognize various alternative designs and embodiments for practicing the invention as defined by the following claims.

The invention claimed is:

1. A control system for a hybrid vehicle having a power transfer unit adapted to drive a vehicle wheel and a power source adapted to drive the power transfer unit, the system comprising:
   a local torque monitor associated with the power source and adapted to implement a local torque mitigation strategy to inhibit undesired torque; and
   a vehicle level torque monitor adapted to implement a vehicle level torque mitigation strategy to inhibit acceleration of the hybrid vehicle if the local torque mitigation strategy does not successfully inhibit undesired torque.

2. The system of claim 1 wherein the power source is an internal combustion engine.

3. The system of claim 1 wherein the power source is a motor-generator.

4. The system of claim 1 further comprising first and second power sources and first and second local torque monitors adapted to monitor and control the first and second power sources, respectively.

5. The system of claim 4 further comprising a vehicle system control unit adapted to control the first and second power sources and receive commands from the vehicle level torque monitor when the vehicle level torque mitigation strategy is implemented.

6. A method for monitoring and controlling torque in a hybrid vehicle, the hybrid vehicle having a power transfer unit adapted to drive a vehicle wheel, at least one power source adapted to provide a driving torque to the power transfer unit, a local torque monitor associated with the at least one power source, and a vehicle level torque monitor associated with the local torque monitor, the method comprising:
   calculating first and second torque values representing estimates of the driving torque;
   determining whether the first and second torque values are within a limit range;
   implementing a local torque mitigation strategy with the local torque monitor to inhibit undesired torque if the first and second torque values are not within the limit range; and
   implementing a vehicle level torque mitigation strategy with the vehicle level torque monitor if the local torque mitigation strategy does not cause the first and second torque values to fall within the limit range in a set period of time.

7. The method of claim 6 wherein the step of determining whether the first and second torque values are within the limit range further comprises sending a pass signal from the local torque monitor to the vehicle level torque monitor if the first and second torque values are within the limit range.

8. The method of claim 6 wherein the step of implementing the vehicle level torque mitigation strategy further comprises sending a failure signal from the local torque monitor to the vehicle level torque monitor.

9. The method of claim 6 wherein the step of implementing the vehicle level torque mitigation strategy further comprises calculating a first torque demand value indicative of acceleration demanded by a vehicle operator, calculating an estimated wheel torque value indicative of a torque provided to the vehicle wheel, and calculating an upper limit value indicative of a maximum acceptable torque at the vehicle wheel.

10. The method of claim 9 wherein the hybrid vehicle further comprises a vehicle system control module and the step of implementing the vehicle level torque mitigation strategy further comprises determining whether the first torque demand value is less than a second torque demand value provided by the vehicle system control unit to assess whether the vehicle system control unit has properly interpreted the acceleration demanded by the vehicle operator.

11. The method of claim 10 wherein the step of implementing the vehicle level torque mitigation strategy further comprises comparing the estimated wheel torque value to the upper limit value to determine whether the vehicle is accelerating more than desired by the vehicle operator.

12. The method of claim 11 wherein the step of implementing the vehicle level torque mitigation strategy further comprises commanding at least one power source to provide less driving torque if the estimated wheel torque value is greater than the upper limit value.

13. A method for monitoring and controlling torque in a hybrid vehicle, the hybrid vehicle having a power transfer unit adapted to drive a vehicle wheel, a power source adapted to provide torque to the power transfer unit, a local torque monitor associated with the power source, a vehicle level torque monitor associated with the local torque monitor, and a vehicle system control unit adapted to receive commands from the vehicle level torque monitor and control the power source, the method comprising the steps of:
   determining first and second estimated torque values and implementing a local torque mitigation strategy with the local torque monitor to inhibit undesired torque if the first and second estimated torque values are not within a limit range;
   implementing a vehicle level torque mitigation strategy if the local torque mitigation strategy does not cause the first and second estimated torque values to fall within the limit range in a set period of time, the vehicle level torque mitigation strategy including:
   calculating an estimated wheel torque value indicative of a torque provided to the vehicle wheel and an upper limit value for the estimated wheel torque value; and
   implementing a torque control strategy if the estimated wheel torque value is greater than the upper limit value.

14. The method of claim 13 wherein the vehicle level torque mitigation strategy repeats the calculating and implementing steps if the estimated wheel torque value is less than the upper limit value.

15. The method of claim 13 wherein the step of calculating the estimated wheel torque value is based on a first signal indicative of a power transfer unit torque ratio and either the first or second estimated torque values.

16. The method of claim 13 wherein the step of calculating the estimated wheel torque value further comprises calculating a first torque demand value indicative of a torque demanded by a vehicle operator, obtaining a second torque demand value from the vehicle system control unit, and comparing the first and second torque demand values to determine whether the vehicle system control unit properly interpreted the torque demanded by the vehicle operator.

17. The method of claim 16 wherein the step of calculating the first torque demand value is based on a second signal indicative of an accelerator pedal position and a third signal indicative of a vehicle speed.

18. The method of claim 13 wherein the step of implementing the local torque mitigation strategy further comprises reducing the torque provided by the power source to the power transfer unit.

19. The method of claim 13 wherein the step of implementing the local torque mitigation strategy further comprises providing a fault mode signal to the vehicle level torque monitor.

20. The method of claim 13 wherein the step of implementing the vehicle level torque control strategy further comprises commanding the vehicle system control unit to reduce the torque provided by the power source.

* * * * *